(12) United States Patent
Doi et al.

(10) Patent No.: US 6,715,305 B2
(45) Date of Patent: Apr. 6, 2004

(54) TWO-EVAPORATOR REFRIGERATOR HAVING A CONTROLLED VARIABLE THROTTLER

(75) Inventors: Takashi Doi, Tokyo (JP); Akihiro Noguchi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/336,028

(22) Filed: Jan. 3, 2003

(65) Prior Publication Data

US 2003/0131618 A1 Jul. 17, 2003

(30) Foreign Application Priority Data

Jan. 15, 2002 (JP) ......................... 2002-006761

(51) Int. Cl.$^7$ ..................... F25D 17/00; F25B 41/04
(52) U.S. Cl. ................. 62/180; 62/223; 62/228.4; 62/510
(58) Field of Search ................ 62/180, 228.4, 62/223, 196.2, 510

(56) References Cited

U.S. PATENT DOCUMENTS

| 4,910,972 | A | * | 3/1990 | Jaster ........................... 62/335 |
| 4,918,942 | A | | 4/1990 | Jaster |
| 4,966,010 | A | * | 10/1990 | Jaster et al. ................... 62/179 |
| 5,056,328 | A | * | 10/1991 | Jaster et al. ................... 62/180 |
| 5,109,678 | A | * | 5/1992 | Jaster et al. ................... 62/175 |
| 5,150,583 | A | * | 9/1992 | Jaster et al. ................... 62/179 |
| 5,191,776 | A | * | 3/1993 | Severance et al. ............. 62/513 |
| 5,235,820 | A | * | 8/1993 | Radermacher et al. ......... 62/114 |
| 5,655,379 | A | * | 8/1997 | Jaster et al. ................... 62/210 |
| 6,460,357 | B1 | * | 10/2002 | Doi et al. ....................... 62/199 |

FOREIGN PATENT DOCUMENTS

GB    2152649 A   *  8/1995   ............. F25B/1/10

* cited by examiner

*Primary Examiner*—Marc Norman
(74) *Attorney, Agent, or Firm*—Pillsbury Winthrop LLP (57) ABSTRACT

A refrigerator has a refrigerant circuit that is comprised of; a power-variable two-stage compressor, a variable throttler, which are computer controlled; and a first evaporator for fresh food compartments and a second evaporator for freezer compartments. Temperatures in the first and second evaporators are controlled independently from each other, by controlling throttling extent of the variable throttler. Temperature in the first evaporator is kept in a range not causing frost formation on surface of the first evaporator, for example in a range from −2° C. to 2° C., by controlling the throttling extent as well as the power of the compressor. In a preferred embodiment, the variable throttler is a pulse motor valve at downstream of a condenser and at upstream of the first evaporator.

11 Claims, 9 Drawing Sheets

FIRST EMBODIMENT

FIG. 1 FIRST EMBODIMENT

FIG. 7 SECOND EMBODIMENT

FIG. 8 THIRD EMBODIMENT

FIG. 9 PRIOR ART

TWO-EVAPORATOR REFRIGERATOR HAVING A CONTROLLED VARIABLE THROTTLER

BACKGROUND OF THE INVENTION

This invention relates to a refrigerator equipped with a two-stage compressor and two evaporators for performing a refrigeration cycle.

Such a refrigerator has been proposed and described in U.S. Pat. No. 4,918,942.

Figure 9:
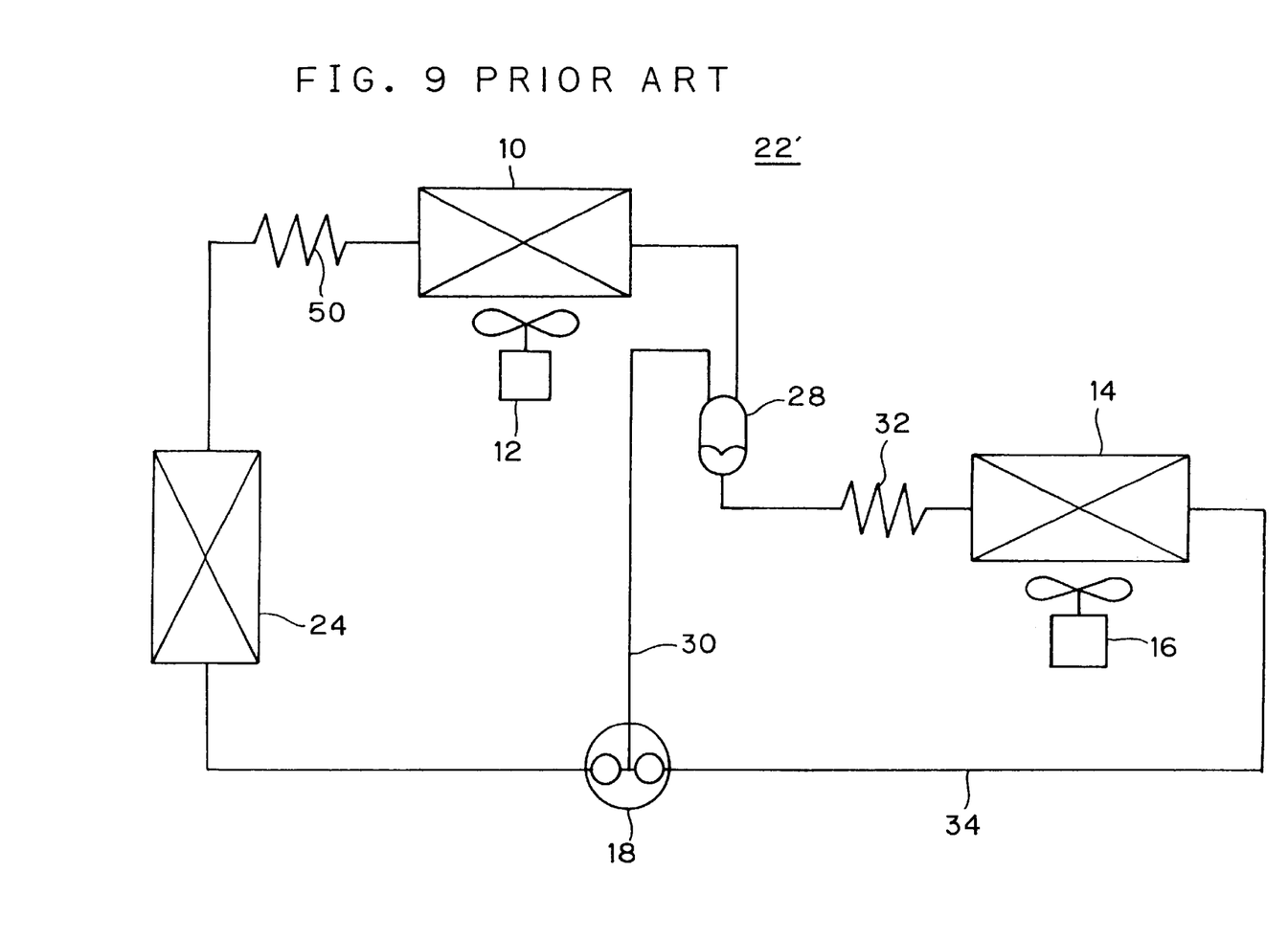
FIG. 9 shows construction of a refrigerant circuit in the prior art.

The refrigeration cycle of the prior art document comprises following steps; each of the steps will be explained by referring FIG. 9, which shows a refrigerant circuit 22'.

(1) Gaseous refrigerant streams out at high pressure from an outlet of the two-stage compressor 18. Then, the gaseous refrigerant is condensed at interior of a condenser 18 to become a two-phase refrigerant composed of gas and liquid phases at high pressure.

(2) The two-phase refrigerant at high pressure is subjected to pressure reduction in a capillary tube 50. Then, the two-phase refrigerant at intermediate pressure flows into an evaporator 10 for fresh food compartments or non-freezing refrigerator compartment (hereinafter referred as "fresh food evaporator").

(3) Liquid-phase part of the two-phase refrigerant partly evaporates at inside of the fresh food evaporator 10. Then, the two-phase refrigerant enters into a separator 28, through which gas-phase and liquid-phase parts are separated from each other. A fan 12 disposed near the fresh food evaporator 10 sends an air cooled by the evaporator 10, into the fresh food compartment.

(4) Gaseous refrigerant that is separated from liquid refrigerant by the separator 28 flows through a suction pipe 30 at intermediate pressure; and then returns to the two-stage compressor 18 through its intermediate-pressure side inlet.

(5) Liquid refrigerant that is separated from the gaseous refrigerant by the separator 28 is subjected to pressure reduction at a capillry tube 32, to form a two-phase refrigerant at low pressure. Then, the two-phase refrigerant at low pressure flows into an evaporator 14 for freezer compartment (hereinafter referred as "freezer evaporator").

(6) Liquid part of the two-phase refrigerant evaporates in the freezer evaporator 14. Thus formed gaseous refrigerant flows through a suction pipe 34 at low pressure; and then returns to the two-stage compressor 18 through its low-pressure side inlet.

In the refrigerant circuit 22', diameter and length of the capillary tubes 50, 32 are invariant; and hence extents of throttling or refrigerant passages in the throttlers are invariant. Hence, when operational power of the compressor 18 increases, that is, when operational frequency of the compressor 18 increases, circulating rate of refrigerant increases; and thereby, pressure reduction at the capillary tubes 50, 32 increases due to increased effect of the throttler.

When inside of the freezer compartment is not cool enough, operational control of the refrigerator is made such as to increase drive frequency of the two-stage compressor 18 for sake of cooling the inside of the freezer compartment; even if inside of the fresh food compartment has been sufficiently cooled. Since the fresh food evaporator is located upstream of the freezer evaporator, temperature dropping in the fresh food evaporator is followed by that in the freezer evaporator. Because temperature drops in both of the fresh food and freezer evaporators, cooling power of the refrigerator is enhanced. Nevertheless, cooling power becomes excessive for the fresh food compartment; thus, it is necessary either dropping down the airflow rate of the fan 12 for the fresh food compartment or stopping of the fan 12.

Such stopping of the fan 12 or dropping down of the air-flow rate may cause insufficient evaporation within the fresh food evaporator, and thereby cause "overflow" of liquid refrigerant at inside of the gas-liquid separator 28; making the liquid refrigerant return to the two-stage compressor 18 through the intermediate-pressure suction pipe 30. Thus, stability or operational safety or stability of the refrigerant circuit 22' is damaged.

BRIEF SUMMARY OF THE INVENTION

First aspect of invention-wise refrigerator comprising: a two-stage compressor having an outlet and first and second inlets, pressure of said first inlet being intermediate between pressures of the outlet at higher pressure and the second inlet at lower pressure; a condenser at downstream of said outlet; a first evaporator at downstream of the condenser; a gas-liquid separator being at downstream of the first evaporator and having a gas-phase refrigerant exit and a liquid-phase refrigerant exit; a second evaporator at downstream of said liquid-phase refrigerant exit; a first suction pipe connecting from the gas-phase refrigerant exit to said first inlet of the compressor; a second suction pipe connecting from the second evaporator to said second inlet of the two-stage compressor; a first fan for sending out air around the first evaporator into a fresh food compartment; a second fan for sending out air around the second evaporator into a freezer compartment; first and second throttlers, respectively interposed between the condenser and the first evaporator, and between said liquid-phase refrigerant exit and the second evaporator, throttling extent of at least one of said first and second throttlers being variable in response of computerized control; sensors for detecting temperatures in the fresh food and freezer compartments and in the first and second evaporators; and controller for controlling power of the compressor and throttling extent of said at least one of the first and second throttlers, based on detection of said sensors, as to keep said temperatures within respective prescribed ranges.

Preferably, throttling extent of said first throttler is varible and controlled by the controller. Alternatively, throttling extent of said second throttler is varible and controlled by the controller. In a more prefered manner, throttling extent of said first and second throttlers being varible and controlled by the controller.

Temperature in the first evaporator is preferably controlled within a prescribed temperature range so that surface temperature of the first evaporator being controlled substantially at 0° C. or more. The prescribed temperature range may be from −2° C. to 2° C. in typical situation.

By such controlling, water on the first evaporator for the fresh food compartment is kept in liquid phase. Thus, although moisture of taken-in air deposited on the evaporator, evaporation therefrom also takes place; and thereby, high humidity in the fresh food compartment is ensured.

According to second aspect of the invention, said refrigerator further comprising a sensor for detecting temperature ambient to the refrigerator; and said controller determining whether such ambient temperature is higher than a prescribed upper limit; and, if so determined, implementing an operational control for coping with such high ambient temperature, in that the first evaporator is kept at substantially lowest of said prescribed temperature range, by controlling said extent of throttling.

By such features, temperature of the first evaporator is kept in ice-free range; and in same time, cooling power of the refrigerator is kept high as to achieve sufficient food preservation in the fresh food compartment, even when the ambient temperature is high.

According to third aspect of the invention, in said refrigerator, said controller implementing an operational control comprising (1)–(3) in following:

(1) determining whether vigorous cooling is needed for the freezer compartment;

(2) reducing temperature in the first evaporator, if so determined, to said prescribed temperature range, by keeping power of the compressor as enhanced to substantially its maximum; while keeping rotational numbers of the first and second fans as raised above their predominant operation range, and by keeping the throttling extent of the first throttler as intense; and then, (3) reducing temperature of the second evaporator to a temperature for the vigorous cooling, while allowing temperature rise in the first evaporator, by further keeping power of the compressor as enhanced to substantially its maximum and by keeping rotational number of the first fan as reduced below its predominant operation range; while keeping rotational number of the second fan as raised above its predominant operation range, and by keeping the throttling extent of the first throttler as intense.

By such construction, the vigorous cooling for the freezer compartment is made and in same time, humidity in the fresh food compartment is kept high.

According to fourth aspect of the invention, in said refrigerator, said controller implementing an operational control comprising (1)–(4) in following:

(1) determining the temperature ambient to the refrigerator to be lower than a prescribed lower limit;

(2) reducing temperature of the first evaporator, if so determined, to a temperature within said prescribed temperature range by keeping power of the compressor as reduced below its predominant operantion range; while rotational numbers of the first and second fans are reduced below their predominant operation range, and throttling extent of the first throttler is kept as loosen;

(3) subsequently, further reducing temperature in the second evaporator to a temperature within a presciribed range or within a predominant operation range of the second evaporator, by further keeping rotational number of the second fan as reduced below its predominant operation range; while stopping the first fan and keeping the throttling extent of the first throttler as intense; and (4) when the temperature of the second evaporator having been reduced to its predominant operation range, making or keeping temperature in the first evaporator as to be ice free on its surface, by loosening the throttle extent of the first throttler substantially to its maximum; while keeping rotaitional number of the first fan within its predominant operation range, and while reducing the rotational number of or stopping the second fan.

In th above (4), preferably, the power of the compressor is further reduced or the compressor is stopped.

By these features, defrosting is made on surface of the first evaporator as to keep high humidity in the fresh food compartment, because refrigerant in sufficiently high temperature flows into the first evaporator.

The throttler that is vairble is preferably a variable valve. The variable valve may be either of a pulse motor valve and an electrical variable valve comprised of piezoelectric actuator

DETAILED DESCRIPTION OF THE INVENTION

<First Embodiment>

Figure 1:
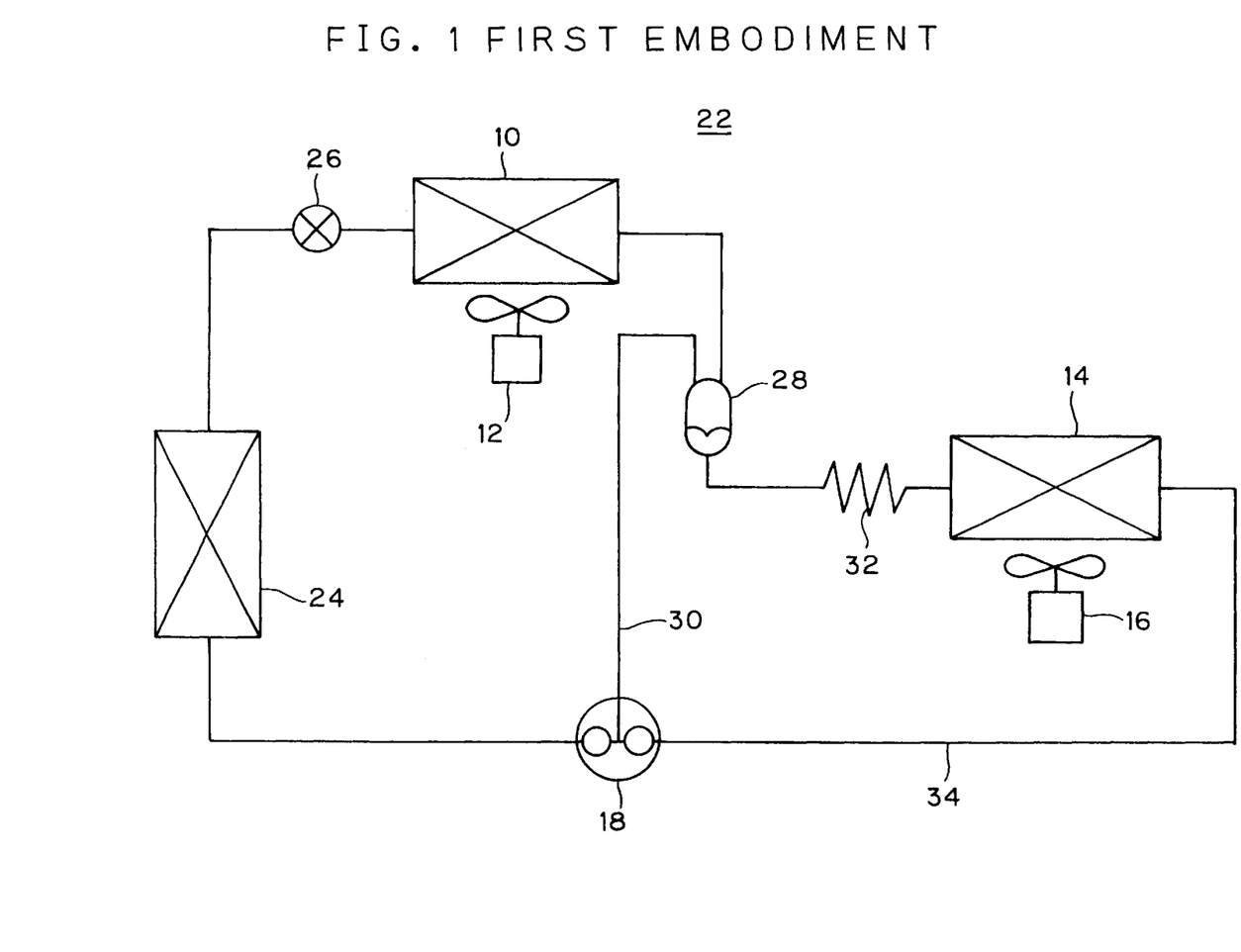
FIG. 1 shows construction of a refrigerant circuit of first embodiment.
Figure 2:
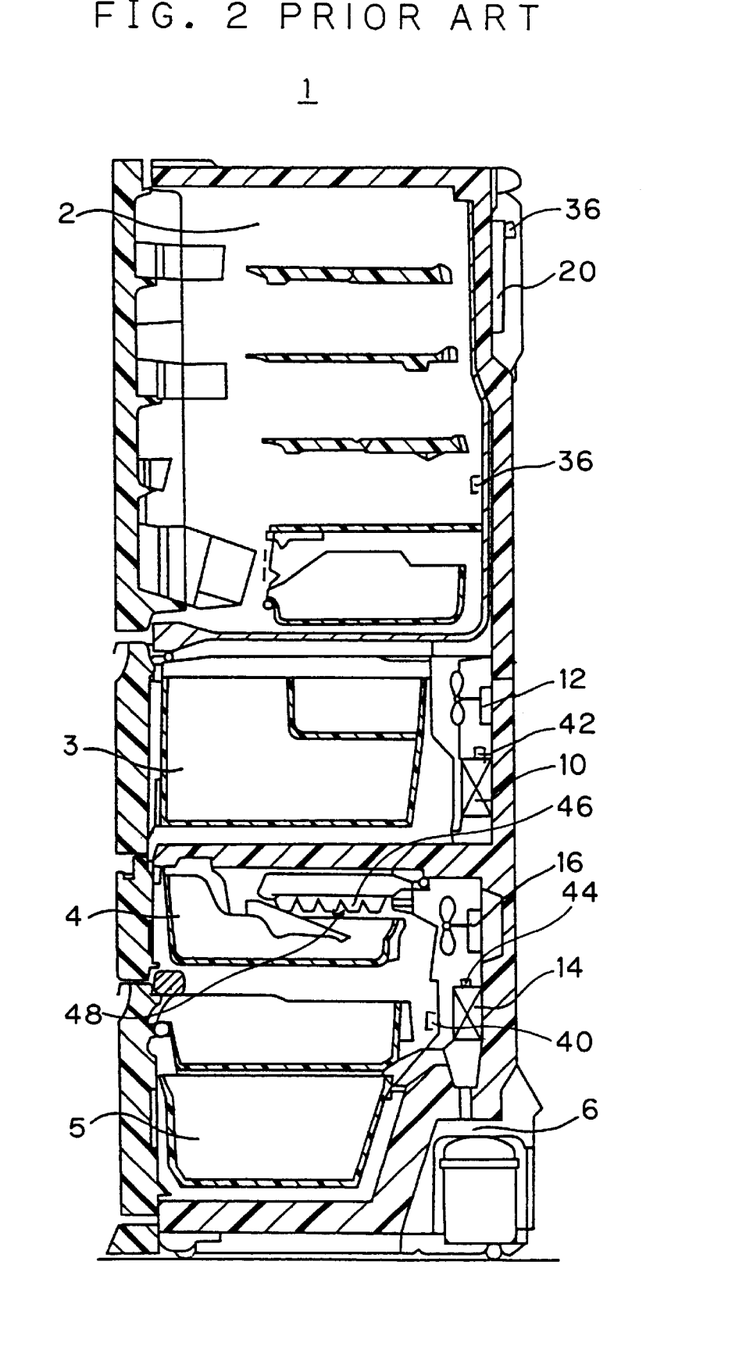
FIG. 2 shows a vertical sectional view of a refrigerator.

The first embodiment of the present invention will be described with reference to FIGS. 1 through 4. FIG. 1 shows construction of a refrigerant circuit of first embodiment; and FIG. 2 shows a vertical sectional view of a refrigerator.

1. Structure of a Refrigerator

On first hand, a structure of a refrigerator is explained with reference to the FIG. 2. At inside of a refrigerator 1, there are arranged a fresh food compartment 2, a vegetable compartment 3, an ice-forming compartment 4 and a freezer compartment 5, in serial in this order from upside to down. At backside of the refrigerator 1, a machinery compartment 6 is arranged in which a two-stage compressor 18 (hereinafter merely referred as "compressor") is disposed. The fresh food compartment 2 and the vegetable compartment 3 altogether form a fresh food area; and the ice-forming compartment 4 and the freezer compartment 5 altogether form a freezer area, which is separated from the fresh food area by a heat-insulator wall.

At backside of the vegetable compartment 3, a fresh food evaporator 10, or an evaporator for non-freezing refrigeration, is disposed for cooling the fresh food area. At upside of the fresh food evaporator 10, a fan 12 for fresh food is disposed for sending out an air cooled by the fresh food evaporator 10 into the fresh food area. Further, for cooling the freezer area, a freezer evaporator 14, or an evaporator for freezing is disposed at backside of a part ranging from the ice-forming compartment 4 to the freezer compartment 5. At upside of the freezer evaporator 14, a fan 27 for freezer is disposed for sending out an air cooled by the freezer evaporator 14 into the freezer area.

A controller device 20 formed of a microcomputer is arranged at backside of top part in the refrigerator 1.

2. Construction and Operation of the Refrigerant Circuit 22

Construction and operation of the refrigerant circuit 22 in a refrigerator 1 is explained with reference to the FIG. 1.

2-1. Gaseous refrigerant is compressed in the compressor 12 and outputted from an outlet of the compressor 12 at high pressure. Then, the gaseous refrigerant at high pressure is condensed at interior of a condenser 24 to be outputted as a two-phase refrigerant composed of gas and liquid phases at high pressure.

2—2. The two-phase refrigerant at high pressure is subjected to pressure reduction in a pulse motor valve (PMV)

26, which is a computer-controlled variable throttler; and then flowing into the fresh food evaporator 10. Then, the two-phase refrigerant of intermediate pressure flows into the fresh food evaporator 10.

The pulse motor valve 26 is, for example, comprised of; a cam-shaped valve body fitted in a cylinder and connected with a rotor of a pulse motor; and inflow and outflow ports formed on periphery wall of the cylinder, as shown in an English abstract of JP-2001-65713A (Japanese Unexamined patent publication No.2001-65713). The pulse motor valve may be replaced with an electrical variable valve comprised of piezoelectric actuator, or with a variable valve having other controlled drive mechanism.

2-3. Liquid-phase part of the two-phase refrigerant partly evaporates at inside of the fresh food evaporator 10. Then, the two-phase refrigerant enters into the gas-liquid separator 28, through which gas-phase and liquid-phase parts are separated from each other.

2-4. Gaseous refrigerant that is separated from liquid refrigerant at the interior of the separator 28 flows through a suction pipe 22 at intermediate pressure; and such intermediate-pressure gaseous refrigerant flows to the two-stage compressor 18 through its intermediate-pressure side inlet.

2-5. Liquid refrigerant that is separated from the gaseous refrigerant by the separator 28 is subjected to pressure reduction at a capillary tube 32, to form a two-phase refrigerant at low pressure. Then, the two-phase refrigerant at low pressure flows into the freezer evaporator 14.

2-6. Liquid part of the two-phase refrigerant evaporates in the freezer evaporator 14 to form a gaseous refrigerant. Then the gaseous refrigerant flowing out from the freezer evaporator 14 flows through a suction pipe 28 at low pressure; and such low-pressure gaseous refrigerant returns to the two-stage compressor 18 through its low-pressure side inlet.

3. Construction of the Electrical System

Figure 3:
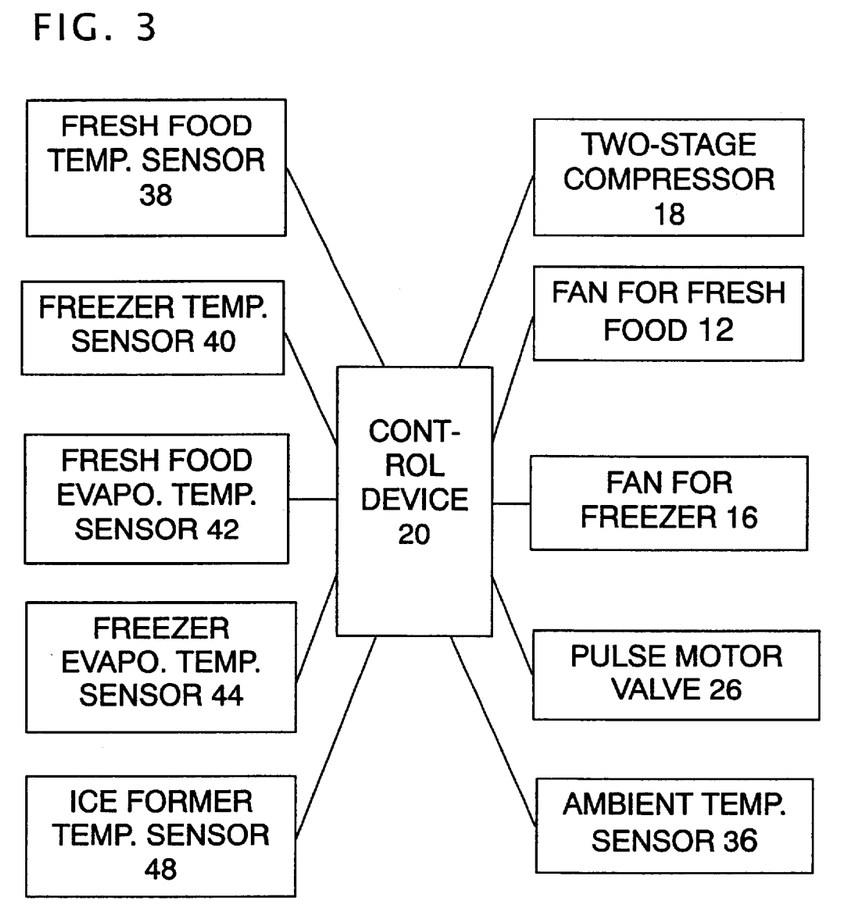
FIG. 3 is a block diagram of electrical system of the refrigerator in the embodiment.

FIG. 3 is a block diagram showing the electrical system for operation of the refrigerant circuit 22 (refrigeration cycle). As shown in the FIG. 3, the control device 20 is electrically connected with—the two-stage compressor 18, the fan 12 for fresh food, the fan 16 for freezer, and the pulse motor valve 26. To the control device 20, also connected are a sensor 36 for detecting temperature ambient to the refrigerator 1, a sensor 38 for detecting a temperature in the fresh food compartment 2, and a sensor 40 for detecting a temperature in the freezer compartment 5; and further connected are a sensor 42 for detecting a temperature in the fresh food evaporator 10, and a sensor 44 for detecting a temperature in the freezer evaporator 14. Moreover, a sensor 48 for detecting a temperature on ice-forming tray 46 in the ice-forming compartment 4 is connected to the control device 20.

4. First Manner of Operational Control

Figure 4:
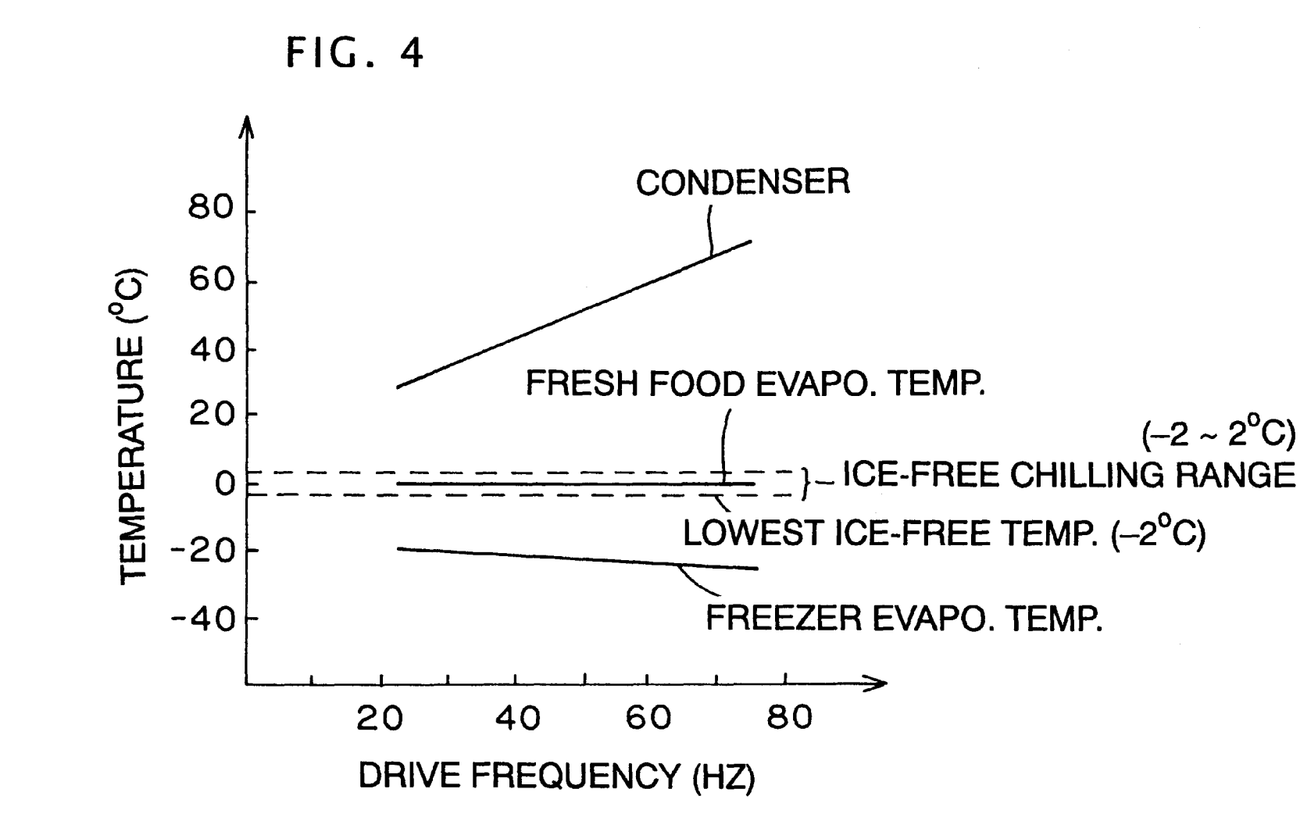
FIG. 4 shows a graph showing first manner of operational control.

With reference to FIG. 4, it will be explained first manner of controlling temperature in each compartment of the above-wise constructed refrigerator 1. FIG. 4 is a graph showing curves of refrigerant temperature; at outlet of the condenser 24, in the fresh food evaporator 10 and in the freezer evaporator 14; with abscissa axis being drive frequency of the two-stage compressor 18.

When to increase cooling power of the refrigeration cycle, increasing is made to drive frequency of a direct-current brushless motor that drives the two-stage compressor 18. Usually, the drive frequency is made varied in a range from 25 HZ to 75 HZ. For example, when inside of the fresh food compartment 2 is fully cooled and inside of the freezer compartment 5 is not, the drive freqency of the compressed 18 is enhanced to increase the cooling power, as just explained. Then, temperatures in both of the fresh food and freezer evaporators 10, 14 would tend to be decreased, as in an instance in the prior art.

According to the first manner of operational control, the temperature in the fresh food evaporator 10 is maintained in an "ice-free chilling range" that is a temperature range from −2° C. to 2° C., in spite of varying of the drive frequency; and, preferably in particular, the temperature being maintained at substantially 0° C. Such controlling of the temperature is made by electrically controlling the extent of throttling or the gate limiting in the valve travel.

By this way of controlling where temperature of the fresh food evaporator 10 being maintained at the "ice-free chilling range", no excess cooling is made to the fresh food evaporator 10 while temperature in the freezer evaporator 14 drops down.

When temperature in the fresh food compartment 2 has ascended as contrast to the above situation, the cooling power is impaired because of substantially invariant temperature of the fresh food evaporator 10. As to offset such impairing, airflow rate of the fan 12 for the fresh food is increased such that necessary amount of heat exchange is made.

As a result of maintaining the fresh food evaporator 10 at the ice-free chilling range, it enables humidity in the fresh food compartment to be kept high; in view of that water droplets or dews adhered on the fresh food evaporator 10 should be evaporating while, in same time, water vapor in taken-in air should be being condensed on to the water droplets or dews on the evaporator. Therefore, food preservability is increased as that fresh foods are kept in a juicy or succulent state avoiding of drying.

5. Second Manner of Operational Control

When the first manner of operational control being conducted, if temperature ambient to the refrigerator increases as in summertime, it is necessary to raise the cooling power; for example, if ambient temperature becomes 35° C. or more. The increase of cooling power for the freezer compartment 5 is made by increasing the drive frequency of the compressor 18. Meanwhile, increasing of the cooling power for the fresh food compartment 2 would be made only through controlling of the airflow rate of the fan 12 for the fresh food, because the temperature of the fresh food evaporator 10 is kept at the ice-free chilling range or substantially at 0° C. Thus, the cooling power for the fresh food may be impaired when ambient temperature has risen.

According to second manner of operational control, in view of the above, the temperature to which the fresh food evaporator 10 be made kept is set to be lowest limit within the ice-free chilling range; when the ambient temperature rises to a prescribed upper limit temperature or more, for example to 35° C. or more. Such to-be made kept temperature may be shifted from 0° C. to −2° C. for example.

Temperature at inside of the fresh food evaporator 10 at which refrigerant evaporates differs from surface temperatures of piping and fins, of the evaporator 10, by amount of resistance against heat conduction. Thus, even when the temperature in the fresh food evaporator 10 is −2° C., temperature at edge of the fins may be 0° C., partly due to heating by taken-in air. Moreover, depositing of frost and water droplets should be concentrated on the edge of fin.

In short, operational control is made in following manner or the like, for example. The temperature of the fresh food evaporator 10 is controlled to be kept at substantially 0° C., in accordance with the first manner of operational control; and, when load for cooling is increased, the temperature to be kept is shifted to −2° C. that is the lower limit of the ice-free chilling range, so as to increase cooling power. By this manner, even when ambient temperature has risen, food preservability is maintained, without causing of depositing with frost and dew, and with keeping high humidity.

6. Third Manner of Operational Control

Instruction of rapidly cooling the freezer 5 may be received during the above-mentioned second manner of operation is being conducted; whereas the second manner deals with an occasion when increase of cooling power is required for the fresh food compartment 2 due to increase of ambient temperature. Such instruction is made; for example, when ice is formed at the ice-forming compartment 4, or when high-temperature food item is introduced into the freezer compartment 5.

Figure 5:
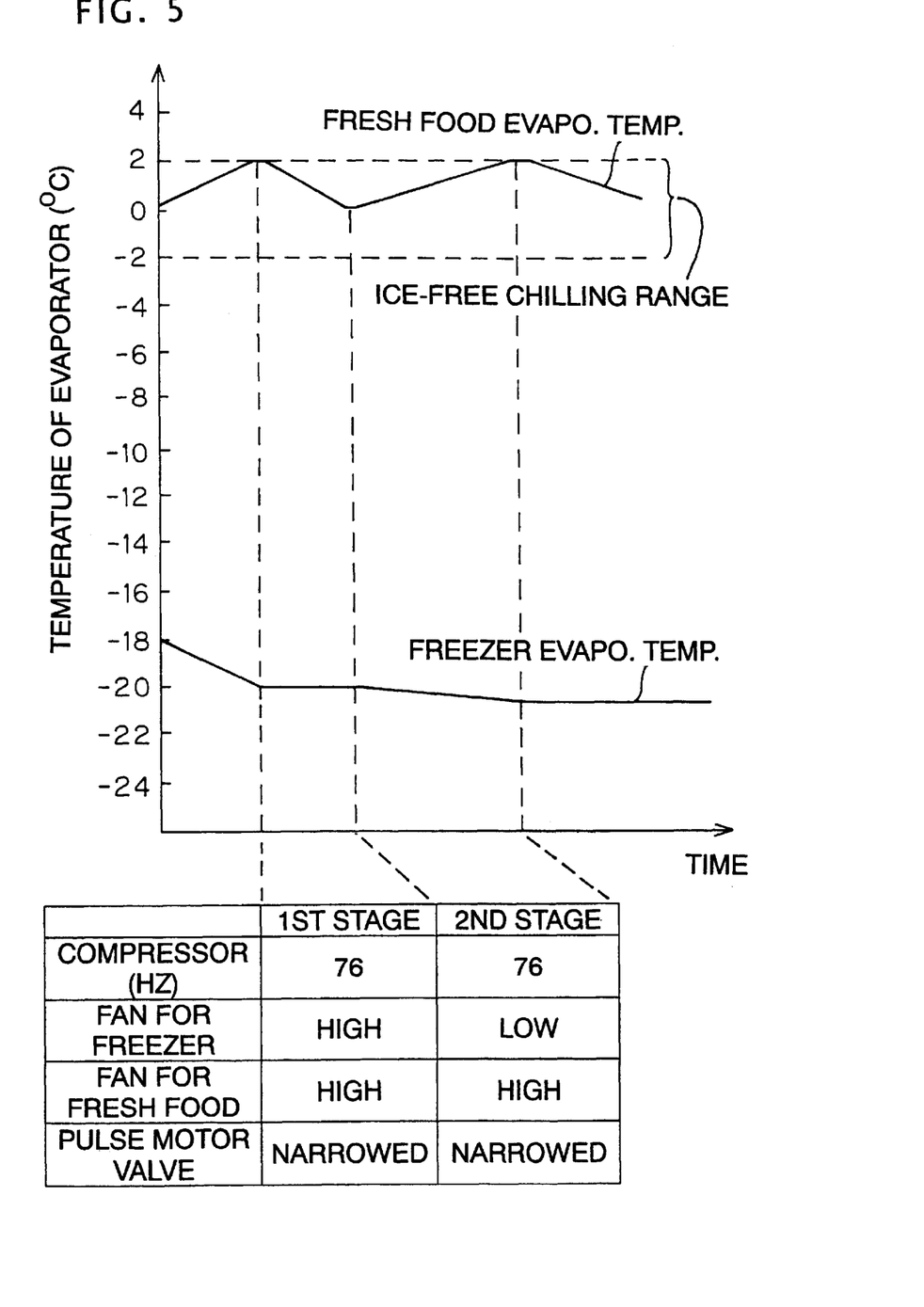
FIG. 5 shows a graph showing third manner of operational control.

In above occasion, operational control is made as follows as shown in FIG. 5.

<1st stage> Firstly, drive frequency of the compressor 18 is raised to its maximum feasible, for example to 76 HZ; rotation number of fans 12, 16 for fresh food and freezer are raised to their maximum feasible; and throttling of the pulse motor valve 26 is controlled to be relatively tight, that is, valve travel in the pulse motor valve 26 is somewhat narrowed down. As a result, cooling powers in both of the fresh food and freezer compartments 2, 5 become their maximum.

<2nd stage> Subsequently, when a temperature detected by a sensor 42 in the fresh food evaporator 10 drops to around center of the ice-free chilling range, that is about 0° C.; rotational number of the fan 12 for fresh food is lowered to its minimum of feasible rotational range. Meanwhile, others are unchanged: rotational number of the fan 16 for freezer is further kept at its maximum feasible; and the throttling of the pulse motor valve 26 is further kept to be relatively tight. As a result, dropping of temperature in the fresh food compartment 2 is stopped. Further, humidity in the fresh food compartment 2 is kept high because no ice formation is made on the fresh food evaporator 10; and a juicy freshness of foods in the fresh food compartment 2 is kept, because high-humidity cooled air is sent into the fresh food compartment 2 due to minimum-rate rotation of the fan 12. Meanwhile, temperatures in the freezer and ice-forming compartments 4, 5 are kept be descending.

In follows, the third manner of operational control explained above is stopped when, for example, the temperature in the ice-forming compartment 4 drops to pre-set lower limit; when judging is made that ice forming is completed.

By these way, while keeping humidity to be high in the fresh food compartment 2, rapid cooling in freezer and ice-forming compartments 4, 5 is realized.

7. Fourth Manner of Operational Control

Fourth manner of operational control is to be conducted in winter period as ambient temperature drops to or below a prescribed temperature, for example to or below 25° C.; whereas foregoing second and third manners of operational control deal with occasion in which the ambient temperature rises to or above a prescribed high temperature.

When to select two-stage compressors to be assembled into refrigerators, selection is prevailingly made such that; operational factor, or an operation time divided by total time, becomes 100% in condition of; 25° C. of ambient temperature, and 25 HZ of drive frequency, which is the prescribed minimum possible frequency.

For this reason, when ambient temperature drops to or below 25° C. as in winter period, the operation factor of the compressor drops. The drop of the operation factor becomes significant because rate of attenuating in temperature difference between inside and ambience of the fresh food compartment 2 is higher than that difference for the freezer compartment 5. In such occasion, although controlling of ariflow rate of the fan 12 for fresh food would be made, the fan 12 maybe stopped when the airflow rate as instructed reaches to minimum rate for the fan 12. Then, the temperature of the fresh food evaporator drops as to cause the water dews residing on its surface are left at below 0° C. and frozen.

Thus, according to fourth manner of operational control, cooling of the freezer compartment 5 is rapidly brought to completion as to prevent frost formation on the fresh food evaporator 10.

Figure 6:
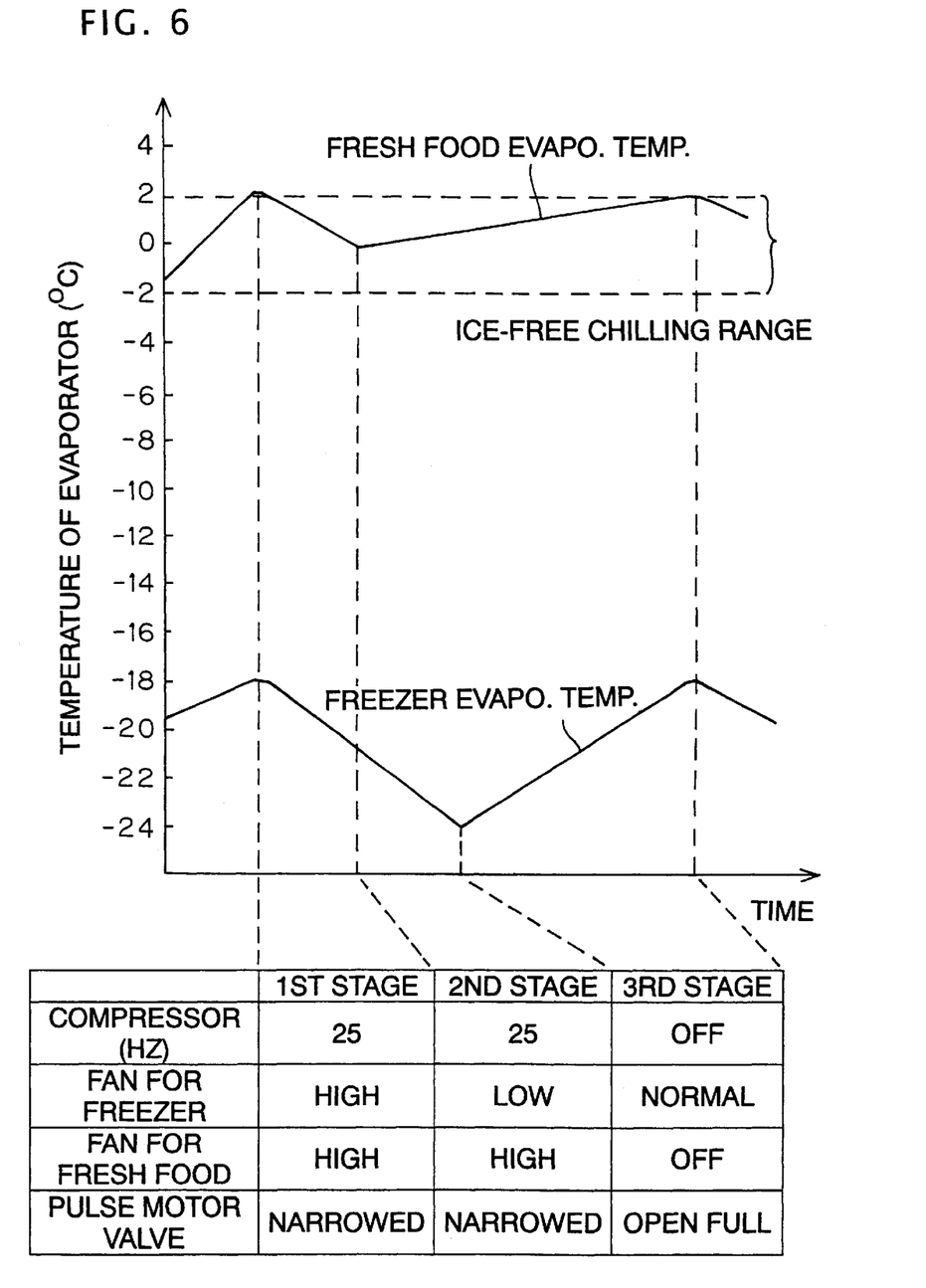
FIG. 6 shows a graph showing fourth manner of operational control.

FIG. 6 is a graph showing time chart of the fourth manner of operational control.

<1st stage> At first, the compressor is operated at the drive frequency of 25 HZ that is minimum feasible; throttling of the pulse motor valve 26 is rather loosen, that is valve travel is relatively opened up; and the fans 12, 16 for fresh food and freezer are kept rotated at their minimum rotational numbers. As a result, temperature drops at inside of both the fresh food and freezer compartments 2, 5.

<2nd stage> When temperature in the fresh food evaporator 10 drops to around center of the ice-free chilling range, that is about 0° C., as to be detected by the sensor 42 in the fresh food evaporator 10; the fan 12 for fresh food is stopped; while the fan 16 for freezer 16 is remained to be rotated at its minimum feasible rotation number; and throttling of the pulse motor valve 26 is moderately tighten, that is the valve travel is relatively narrowed down. As a result, temperature in the fresh food compartment 2 stops of dropping and starts to increase, while temperature in the freezer compartment 5 remains as being decreased further.

<3rd stage> When temperature in the freezer compartment 5 drops to a prescribed temperature as to be detected by a sensor 42 in the freezer compartment 5, the compressor 18 and the fan 16 for the freezer are stopped. As a result, dropping of temperature inside of the freezer compartment 5 is stopped.

In this stage, defrosting may be made by controlling the rotation of the fan 12 for fresh food to be moderate or become one within its predominant operation range; and, in same time, by controlling the valve travel in the pulse motor valve 26 to be fully opened. Such way of controlling makes high-temperature refrigerant flow into the fresh food evaporator 10 and defrosting, which enhances humidity of air around the evaporator, so that high-humidity of cooled air is sent into the fresh food and compartments. Consequently, high humidity is maintained in the fresh food compartment 2 and, in same time, the cooling power for the freezer compartment 5 is enhanced.

<Second Embodiment>

Figure 7:
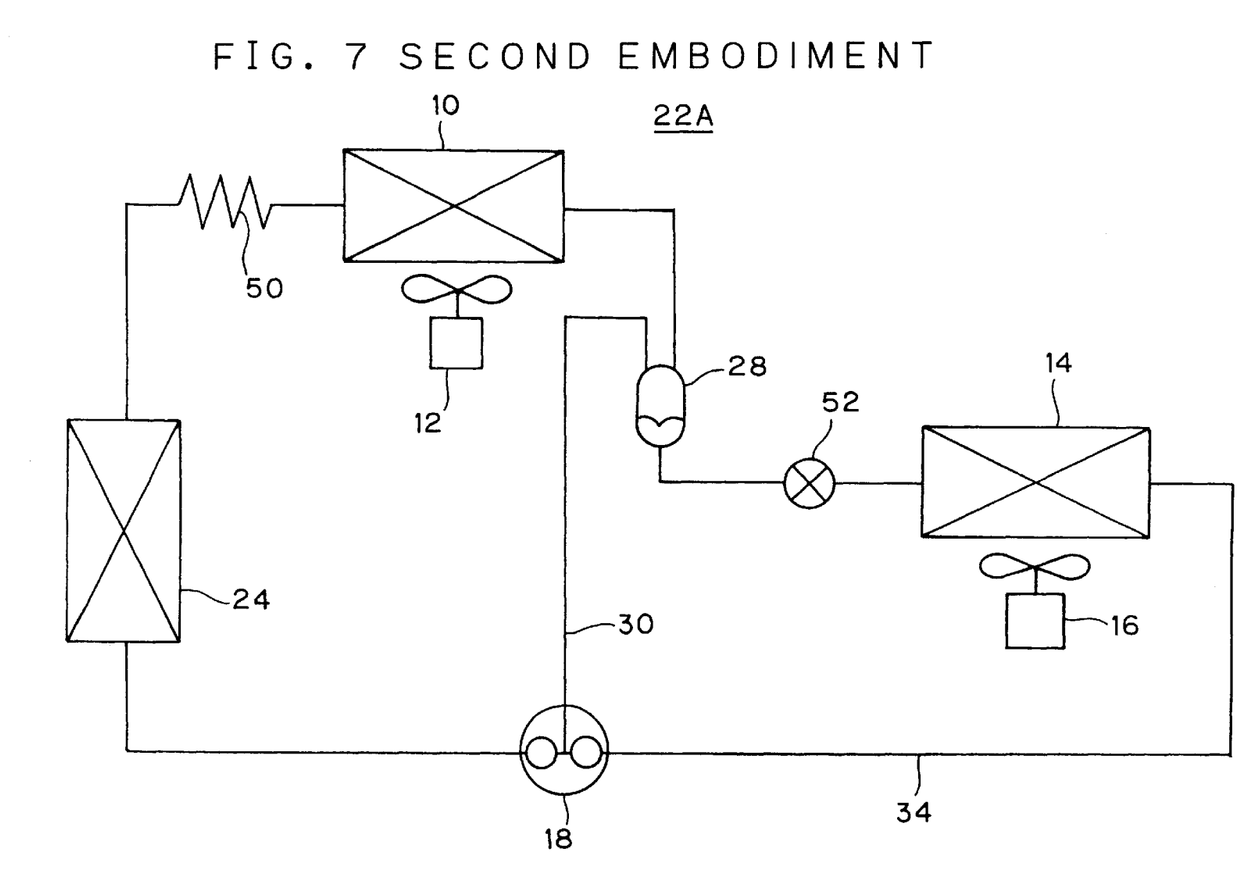
FIG. 7 shows construction of a refrigerant circuit of second embodiment.

FIG. 7 shows construction of refrigerant circuit 22A in second embodiment.

The refrigerant circuit in this embodiment differs from that of the first embodiment in that; a capillary tube 50 is used in place of the pulse motor valve 26; and a pulse motor valve 52 is used in place of the capillary tube 32.

When the pulse motor valve 52 is controlled by use of the control device 20, may be realized is the first through fourth manner of operational control as in the first embodiment.

According to the third manner of operational control in particular, following is realized by narrowing down of the valve travel of the pulse motor valve 52; temperature decreases only at the freezer evaporator 14 without decrease at temperature of the fresh food evaporator 10.

<Third Embodiment>

Figure 8:
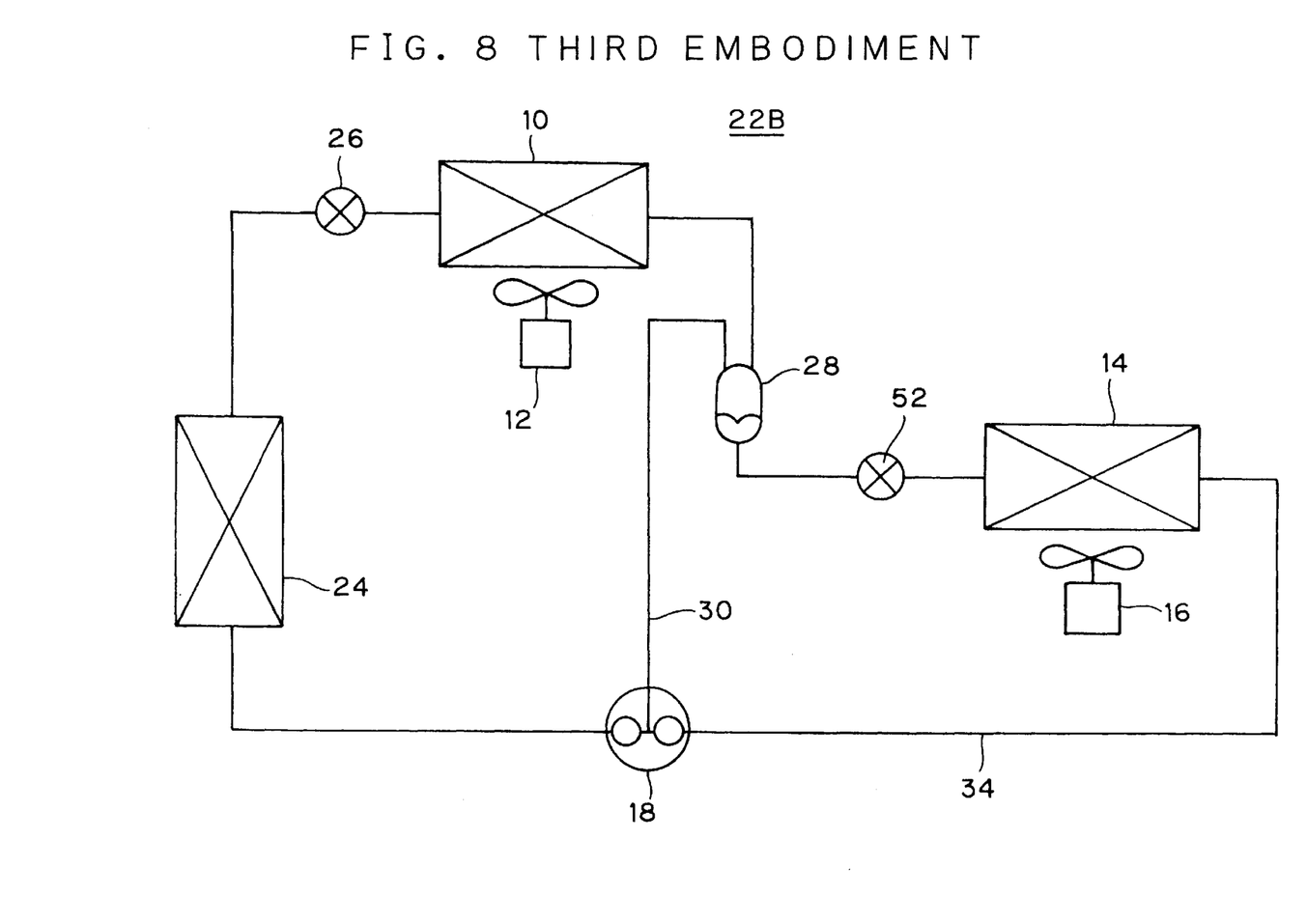
FIG. 8 shows construction of a refrigerant circuit of third embodiment.

FIG. 8 shows construction of refrigerant circuit 22B in thrid embodiment.

The refrigerant circuit in this embodiment differs from that of the second embodiment in that; a capillary tube 50 is used in place of the pulse motor valve 26; and a pulse motor valve 52 is used in place of the capillary tube 32.

Also by use of such refrigerant circuit 22B, the first through fourth manners of operational control may be realized.

As explained before, the pulse motor valve 26 in abovementioned refrigerant circuits may be replaced with an electrical variable valve having a piezoelectric actuator or with other variable valve. The pulse motor valve may also be replaced with a combination of such a variable valve and a capillary tube. In a further alternative manner, extent of throttling may be changed or controlled by switching between a plurality of capillary tubes that have different inner diameter from each other.

As explained hereto, by use of a refrigerator and controlling manner of the embodiments, temperatures in the fresh food and freezer evaporators are independently controlled from each other; thereby enabling a control as to set and keep temperature in the fresh food and freezer compartments independently from each other, in response to intended use of each compartment.

In particular, by controling as to keep the fresh food evaporator at the ice-free temperature, frosts deposition and dews deposition are prevented and thereby cooled air of high humidity is sent into the fresh food compartments.

CROSS-REFERENCE TO RELATED APPLICATIONS

This application is based upon and claims the benefits of priority from the prior Japanese Patent Applications No. 2002-6761 filed on Jan. 15, 2001; the contents of which are incorporated herein by reference.

What is claimed is:

1. A refrigerator comprising:

a two-stage and power-variable compressor having an outlet and first and second inlets, pressure of said first inlet being intermediate between pressures of the outlet at higher pressure and the second inlet at lower pressure;

a condenser at downstream of said outlet;

a first evaporator at downstream of the condenser;

a gas-liquid separator being at downstream of the first evaporator and having a gas-phase refrigerant exit and a liquid-phase refrigerant exit;

a second evaporator at downstream of said liquid-phase refrigerant exit;

a first suction pipe connecting from the gas-phase refrigerant exit to said first inlet of the compressor;

a second suction pipe connecting from the second evaporator to said second inlet of the two-stage compressor;

a first fan for sending out air around the first evaporator into a fresh food compartment;

a second fan for sending out air around the second evaporator into a freezer compartment;

first and second throttlers, respectively interposed between the condenser and the first evaporator, and between said liquid-phase refrigerant exit and the second evaporator, throttling extent of at least one of said first and second throttlers being variable in response of computerized control;

sensors for detecting temperatures in the fresh food and freezer compartments and in the first and second evaporators; and controller for controlling power of the compressor and throttling extent of said at least one of the first and second throttlers, based on detection of said sensors, as to keep said temperatures within respective prescribed ranges.

2. A refrigerator according to claim 1, throttling extent of said first throttler being varible and controlled by the controller.

3. A refrigerator according to claim 1, throttling extent of said first and second throttlers being varible and controlled by the controller.

4. A refrigerator according to claim 1, temperature in the first evaporator being controlled at a prescribed temperature range so that surface temperature of the first evaporator being kept substantially at 0° C. or more.

5. A refrigerator according to claim 4, said prescribed temperature range being from −2° C. to 2° C.

6. A refrigerator according to claim 4 or claim 5, further comprising a sensor for detecting temperature ambient to the refrigerator; and said controller implementing an operational control comprising:

determining whether ambient temperature detected is higher than a prescribed upper limit; and, if so determined, making and keeping the first evaporator at substantially lowest of said prescribed temperature range, by controlling said extent of throttling.

7. A refrigerator according to claim 4 or claim 5, said controller implementing an operational control comprising:

determining whether vigorous cooling is needed for the freezer compartment;

reducing temperature in the first evaporator, if so determined, to said prescribed temperature range, by keeping power of the compressor as enhanced to substantially its maximum; while keeping rotational numbers of the first and second fans as raised above their predominant operation range, and by keeping the throttling extent of the first throttler as intense; and then, reducing temperature of the second evaporator to a temperature for the vigorous cooling, while allowing temperature rise in the first evaporator, by further keeping power of the compressor as enhanced to substantially its maximum and by keeping rotational number of the first fan as reduced below its predominant operation range; while keeping rotational number of the second fan as raised above its predominant operation range, and by keeping the throttling extent of the first throttler as intense.

8. A refrigerator according to claim 4 or claim 5, further comprising a sensor for detecting temperature ambient to the refrigerator; and said controller implementing an operational control comprising:

determining the temperature ambient to the refrigerator to be lower than a prescribed lower limit;

reducing temperature of the first evaporator, if so determined, to a temperature within said prescribed temperature range by keeping power of the compressor as reduced below its predominant operantion range; while rotational numbers of the first and second fans are reduced below their predominant operation range, and throttling extent of the first throttler is kept as loosen;

subsequently, further reducing temperature in the second evaporator to a temperature within a presciribed range or within a predominant operation range of the second evaporator, by further keeping rotational number of the second fan as reduced below its predominant operation range; while stopping the first fan and keeping the throttling extent of the first throttler as intense; and when the temperature of the second evaporator having been reduced to its predominant operation range, making or keeping temperature in the first evaporator as to be ice free on its surface, by loosening the throttle extent of the first throttler substantially to its maximum; while keeping rotaitional number of the first fan within its predominant operation range, and while reducing the rotational number of or stopping the second fan.

9. A refrigerator according to claim 8, wherein the power of the compressor is further reduced or the compressor is stopped when said making or keeping temperature in the first evaporator as to be ice free on its surface.

10. A refrigerator according to claim 1, said at least one of the throttlers being a variable valve.

11. A refrigerator according to claim 10, said variable valve being either of a pulse motor valve and an electrical variable valve comprised of piezoelectric actuator.

* * * * *